United States Patent
Casamassima et al.

(10) Patent No.: US 10,766,458 B2
(45) Date of Patent: Sep. 8, 2020

(54) SENSOR FUSION FOR PASSIVE KEYLESS ENTRY SYSTEMS

(71) Applicant: NXP B.V., Eindhoven (NL)

(72) Inventors: Filippo Casamassima, Graz (AT); Wolfgang Eber, Styria (AT)

(73) Assignee: NXP B.V., Eindhoven (NL)

( * ) Notice: Subject to any disclaimer, the term of this patent is extended or adjusted under 35 U.S.C. 154(b) by 234 days.

(21) Appl. No.: 16/035,288

(22) Filed: Jul. 13, 2018

(65) Prior Publication Data

US 2020/0017071 A1  Jan. 16, 2020

(51) Int. Cl.
| | |
|---|---|
| *B60R 25/24* | (2013.01) |
| *E05F 15/76* | (2015.01) |
| *B60R 25/20* | (2013.01) |
| *B60Q 1/02* | (2006.01) |
| *B60Q 1/26* | (2006.01) |

(52) U.S. Cl.
CPC ............ *B60R 25/24* (2013.01); *B60R 25/209* (2013.01); *B60Q 1/02* (2013.01); *B60Q 1/26* (2013.01); *B60Q 2900/30* (2013.01); *E05F 15/76* (2015.01); *E05Y 2900/531* (2013.01)

(58) Field of Classification Search
CPC ........ B60R 25/24; B60R 25/209; E05F 15/76; B60Q 1/02; B60Q 1/26; B60Q 2900/30
See application file for complete search history.

(56) References Cited

U.S. PATENT DOCUMENTS

| | | |
|---|---|---|
| 8,976,005 B2 | 3/2015 | Zivkovic et al. |
| 9,593,522 B1 * | 3/2017 | Murar ................... E05F 15/77 |
| 9,781,106 B1 | 10/2017 | Vitus et al. |
| 9,886,805 B1 | 2/2018 | Bianchi, III et al. |
| 2010/0261984 A1 * | 10/2010 | Tsai ................... G01C 21/165 600/306 |
| 2014/0091906 A1 * | 4/2014 | Lee ......................... G05B 1/01 340/5.61 |
| 2014/0176304 A1 * | 6/2014 | Park ................... G07C 9/00309 340/5.61 |
| 2014/0368313 A1 | 12/2014 | Seiberts |
| 2017/0158168 A1 * | 6/2017 | Nantz ................ G07C 9/00309 |
| 2017/0166163 A1 * | 6/2017 | Poma ..................... B60R 25/24 |

FOREIGN PATENT DOCUMENTS

| | | |
|---|---|---|
| DE | 102011001226 A1 | 9/2012 |
| DE | 102011050160 A1 | 11/2012 |
| EP | 2 612 795 A1 | 10/2013 |

OTHER PUBLICATIONS

Casamassima, F. et al. "Context aware power management for motion-sensing body area network nodes", Proceedings of the conference on Design, Automation & Test in Europe, European Design and Automation Association, 3001 Leuven, Belgium, Belgium, Article 170 , 6 pages (2014).

* cited by examiner

*Primary Examiner* — Hussein Elchanti
(74) *Attorney, Agent, or Firm* — Rajeev Madnawat

(57) ABSTRACT

An electronic key a vehicle is disclosed. The electronic key includes an inertial sensor, a microcontroller coupled to the inertial sensor and a transmitter/receiver coupled to the microcontroller. The microcontroller is configured to perform an operation, the operation includes detecting a motion, turning a radio of the transmitter/receiver on, determining that a distance to the vehicle is less than a preselected distance, determining an activity using a sensor fusion process, determining that the distance to the vehicle is decreasing and performing a preselected operation on the vehicle.

13 Claims, 2 Drawing Sheets

SENSOR FUSION FOR PASSIVE KEYLESS ENTRY SYSTEMS

BACKGROUND

Passive keyless entry (PKE) is an automotive security system that operates automatically when the user of a vehicle is in proximity to the vehicle, unlocking the door on approach or when the door handle is pulled and locking it when the user walks away or touches the car on exit. The vehicle may also be started by the user when the PKE system is detected inside of the vehicle. PKE systems may also be used to secure buildings or areas of buildings.

PKE System for car access rely on wireless technology for the communication between the vehicle and the key device (Key device can be a key-fob, a smartphone or any other portable radio enabled device).

Sensor fusion is combining of sensory data or data derived from disparate sources such that the resulting information has less uncertainty than would be possible when these sources were used individually. The term uncertainty reduction in this case can mean more accurate, more complete, or more dependable data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, an electronic key a vehicle is disclosed. The electronic key includes an inertial sensor, a microcontroller coupled to the inertial sensor and a transmitter/receiver coupled to the microcontroller. The microcontroller is configured to perform an operation, the operation includes detecting a motion, turning a radio of the transmitter/receiver on, determining that a distance to the vehicle is less than a preselected distance, determining an activity using a sensor fusion process, determining that the distance to the vehicle is decreasing and performing a preselected operation on the vehicle.

In some examples, if no walking or running or a combination thereof is detected through sensor fusion for a preselected time, the radio is turned off. Similarly, the radio is turned off when the distance to the vehicle is found not decreasing while analyzing the activity. For example, if the electronic key is moving away from the vehicle, even though the activity is walking or running, the radio is turned off. In some examples, the electronic key may have a radio for communication and another radio for distance measurements.

It should be noted that prior to the detecting a motion, the radio is off and the microcontroller operates in a low power mode in which at least some of internal modules of the microcontroller are powered off. Upon detecting a motion, the microcontroller is configured to continuously start collecting data from the inertial sensor The sensor fusion process includes analyzing and processing data from the inertial sensor and using calibration data to determine the activity. The microcontroller is configured to filter the collected data to remove high frequency noise from a output of the inertial sensor, to break up the filtered data into chunks, to analyze the chunks to extract features associated with the detected motion and to determine the activity based on extracted features.

In some examples, the preselected vehicle operation includes at least one of opening a door, turning on lights, displaying welcome message and starting engine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

Passive keyless entry (PKE) system provides a convenience and apparently better security because unlike old type lock and ignition keys, PKE key fob may not be duplicated. The car and the key fob communicate with each other using a combination of both Low Frequency and Ultra High Frequency radio signals. The door lock and unlock functions, as well as the engine start functions, are activated by the proximity of the key fob to the car. When the key is brought close to the car, it issues a command to open the car and turn on the ignition. However, it has been found that an intruder may use a simple device to capture signals from the car and relaying them to the key fob, thus making it appear that the key fob is closer proximity of the vehicle than it actually is, and causing the doors to be unlocked, for example.

The embodiments described herein uses tracking of user's activities to provide better security to the PKE system. The key fob may also be made more efficient in terms of the use of power, thus extending battery life.

Figure 1:
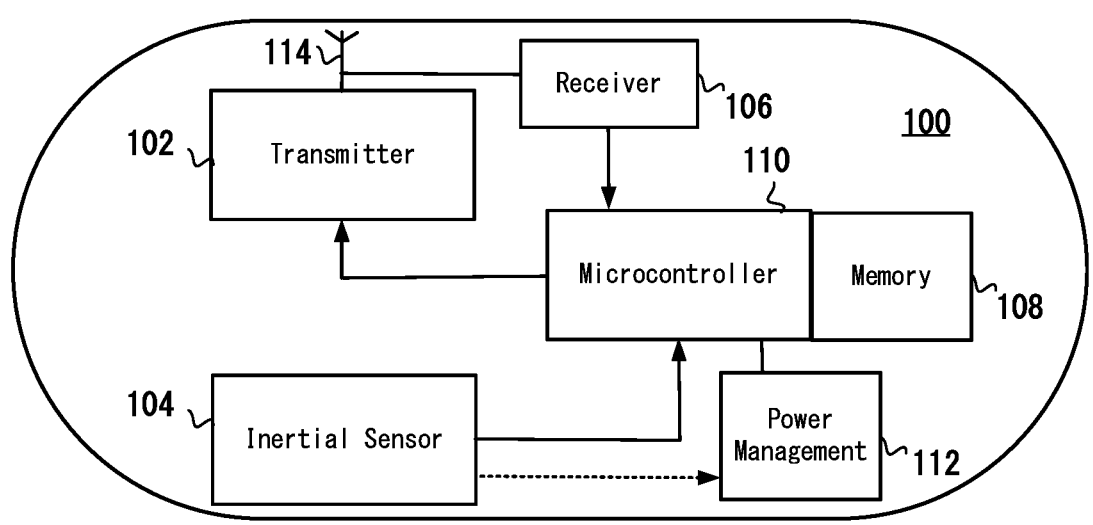
FIG. 1 shows a block diagram of an electronic key in accordance with one or more embodiments.

FIG. 1 shows a block diagram of an electronic or PKE key fob 100. Not that not all components of a key fob are shown in FIG. 1 in that well known components have been omitted so as not to obfuscate the present disclosure. The key fob 100 includes an inertial sensor or accelerometer 104 to detect motion. The inertial sensor 104 measures acceleration, which is the rate of change of the velocity of an object. The inertial sensor 104 measure in meters per second squared (m/s$^2$) or in G-forces (g). A single G-force is equivalent to 9.8 m/s$^2$, but this does vary slightly with elevation. In other words, the inertial sensor 104 senses vibrations in the key fob 100. The key fob 100 also includes a transmitter 102 along with an antenna 114 to transmit signals to the vehicle (not shown) associated with the key fob 100. Note that even though the term "vehicle" is being used in the description, the embodiments described herein may also be used for other systems, such as operating a building door through the key fob 100. A programmable microcontroller 110 is also included. The microcontroller 110 may include a memory 108. Alternatively, the memory 108 may be outside of the microcontroller 108. A power management module 112 is provided to power on, off or to put in sleep mode various components such as a radio of the transmitter 102. The key fob 100 may also include a receiver 106 to receive signals from the vehicle.

The microcontroller 110 is programmed to perform ranging operations to determine a distance of the key fob 110 from the associated vehicle. Typically, a vehicle may include multiple transmitters places at various places inside/outside the vehicle to sense if a typical key fob is inside or outside the vehicle and within a preset distance range. These transmitters send beacons at a predetermined interval. If the key fob is within a preset range, the key fob is woken up using a predefined signal sequence. However, this technique is prone to relay attacks that include sending false beacons to the key fob to wake it up and then have the key fob send a command to, for example, open vehicle's doors. However, the key fob 100 described here is configured to disregard beacon signals from the vehicle until the key fob 100 determines that, based on user's activities, the user of the key fob 100 is in the close proximity of the vehicle and approaching the vehicle.

The microcontroller 110 is programmed to receive raw data from the inertial sensor 104 and collect the data for a predetermined period. The sampling period and frequency may depend on user's activity. Based on initially collected data, if the microcontroller 110 determines that the user is not performing an activity, the sampling frequency is reduced. In some embodiments, the microcontroller 110 stays in a low power mode in which inertial sensor is polled periodically and when an activity is detected, the microcontroller 110 wakes up. In some embodiments, the power management module 112 may receive activity information from the inertial sensor 104 and send a wake up signal to the microcontroller 110.

When a physical activity is detected through the inertial sensor 104, the microcontroller 110 starts to collect raw data from the inertial sensor 104. The raw data is filtered to remove data that deviates beyond a threshold from the mean. For example, high frequency noise (e.g., sudden high frequency vibrations may be noise) is removed. Collected raw data is segmented in chunks and each chuck of data is analyzed. To reduce computational efforts and memory limitations in the resource limited key fob 100, the segmented chunks are processed to extract relevant features. Mathematical operations such as average, max/min, standard deviation, zero/mean crossing rate, peak counter, or frequency features, spectral power, dominant frequency are performed on the each chunk of data.

It should be noted that the output of the inertial sensor 104 is a waveform with varying frequency and amplitude based on a user's activity. In some embodiments, the wave pattern and its closeness, in terms of frequency and amplitude, with the calibration data for different activities may be used to identify an activity. The process of identification may be performed for a few seconds on chunks of data to closely identify user's activity.

Feature classification is the final step of the activity detection algorithm and it feeds the extracted features to a classification algorithm to detect the proper activity. Calibration data may be used for various activities and the detection algorithm may compare the filtered data derived from the inertial sensor 104 with the stored calibration data to determine a user's activity. The classification algorithm can be chosen according to a trade-off between computational complexity and detection accuracy. Among the classification algorithm, the preferred for a resource limited Key fob are decision Tree, Bayesian Classifier, K nearest neighbors, support Vector Machine, Linear Discriminant. Where more resources are available in a key (such as a smart phone), more complex algorithms such as Neural Networks, Markov chains, may also be used. These algorithms are well known in the art, hence a detailed discussion is being omitted.

The activity detection algorithms provide indication whether the user carrying the key fob 100 is walking, running, Bicycling, sitting, going through stairs, etc. Once an activity that implies movement is detected, the key fob 100 enables its radio transceiver and tries to communicate with the associated vehicle. The communication method depends on the type of the key device. For example, a smart phone can start advertising or scanning using Bluetooth Low Energy (BLE) and a classical key fob based on Low frequency (LF) can enable its LF field detector.

Once the communication with the car is established, the key fob 100 continue to monitor the user activity and at the same time starts ranging measurement to estimate the distance with the car. These distance estimations can be performed either using Received Signal Strength Indication (RSSI), or can also rely on Time of Flight measurement. In one example, if the key fob 100 detects that the key fob 100 is being carried by a user who is walking or running towards the associated vehicle through activity detection and distance estimations, the internal components of the key fob 100 are put on powered state. In another example, if the user is walking away from the associated vehicle, at least some of the internal components as shown in FIG. 1 are either powered off or put on a sleep mode.

The sensor fusion algorithm described above checks the user activity and the changes in distance estimation and when the user is close enough, messages are sent to the car for unlocking or enable comfort features (e.g., Welcome light). If the sensor fusion algorithm does not recognize the activity as a valid car approach, no unlock messages are sent to and the radio is turned off to prevent relay attacks and to save power.

Figure 2:
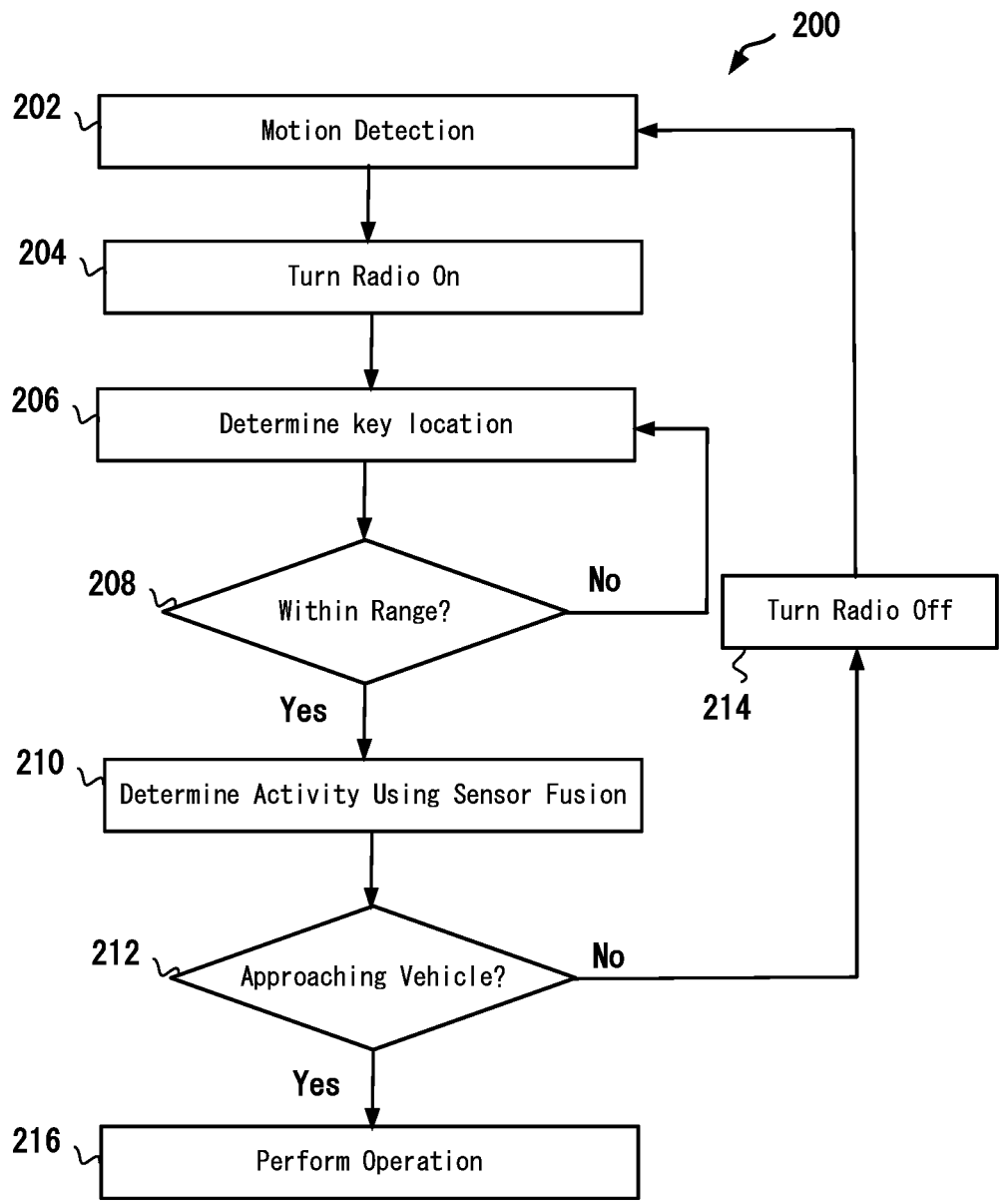
FIG. 2 illustrates a method for performing an operation using the electronic key in accordance with one or more embodiments.

FIG. 2 illustrates a method 200 for performing an operation using the key fob 100. Accordingly, at step 202, using the inertial sensor 104, the microcontroller 110 determines if there a physical motion (e.g., a movement in the key fob 100). If a motion is detected, at step 204, the microcontroller 104, through the power management module 112, turns on the radio the receiver 106. At step 206, through RSSI or time in flight measurements, the microcontroller 110 determines if the distance between the key fob 100 and the associated vehicle is decreasing (indicating that the key fob 100 is approaching the vehicle). At decision step 208, the microcontroller 110 determines if the distance between the key fob 100 is within a preset threshold. RF signal strength may be measured to determine if the key fob 100 is within a preselected distance from the associated vehicle. Time of Flight of RF signal may also be used to determine a distance from the associated vehicle. It should be noted that merely ensuring that the key fob 100 is within the range alone does not provide sufficient security because in a multi-path environment where are there interferences and obstacles around the key fob 100, the range measurement may not be accurate. If the distance is not within the preset range, the control goes back to step 206. If the key fob 100 remain outside the preset range, after a preset, the control goes back to step 202. If the key fob 100 is determined to be within the preset range, at step 210, the user's activity is determined using sensor fusion process described above and if it is determined that the user is walking or running, at decision step 212, it is determined if the user is approaching the vehicle. If no, at step 214, the radio is turned off and control goes back to step 202. If it is determined that the user is approaching the vehicle, at step 216, the key fob 100 performed one or more preset operations such as sending a signal to unlock the vehicle doors and/or turning on lights, etc. In some embodiments, the operations to be performed may be programmed into the microcontroller 110.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An electronic key a vehicle, comprising:
   an inertial sensor;
   a microcontroller coupled to the inertial sensor;
   a transmitter/receiver coupled to the microcontroller; and
   wherein the microcontroller is configured to perform an operation, the operation includes detecting a motion, turning a radio of the transmitter/receiver on, determining that a distance to the vehicle is less than a preselected distance, determining an activity using a sensor fusion process, determining that the distance to the vehicle is decreasing and performing a preselected vehicle operation on the vehicle, wherein the turning on of the radio includes receiving a wake up signal from the vehicle and disregarding the wake up signal if the determined activity is not one of a predetermined activities.

2. The electronic key of claim 1, wherein the activity is walking or running.

3. The electronic key of claim 2, wherein if the activity is not detected for a preselected period, the radio is turned off.

4. The electronic key of claim 1, wherein the radio is turned off when the distance to the vehicle is found not decreasing.

5. The electronic key of claim 1, wherein prior to the detecting a motion, the radio is off.

6. The electronic key of claim 1, wherein prior to the detecting a motion, the microcontroller operates in a low power mode in which at least some of internal modules of the microcontroller are powered off.

7. The electronic key of claim 1, wherein the sensor fusion process includes analyzing and processing data from the inertial sensor and using calibration data to determine the activity.

8. The electronic key of claim 1, wherein upon detecting a motion, the microcontroller is configured to continuously start collecting data from the inertial sensor.

9. The electronic key of claim 8, wherein the microcontroller is configured to filter the collected data to remove high frequency noise from a output of the inertial sensor.

10. The electronic key of claim 9, wherein the microcontroller is configured to divide the filtered data into chunks.

11. The electronic key of claim 10, wherein the microcontroller is configured to analyze the chunks to extract features associated with the detected motion.

12. The electronic key of claim 11, wherein the microcontroller is configured to determine the activity based on extracted features.

13. The electronic key of claim 1, wherein the preselected vehicle operation includes at least one of opening a door, turning on lights, displaying welcome message and starting engine.

* * * * *